United States Patent
Lin (10) Patent No.: US 7,532,904 B2
(45) Date of Patent: May 12, 2009

(54) ADAPTIVE PICONET PROTOCOL

(75) Inventor: Jason (Ming) Yu Lin, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 915 days.

(21) Appl. No.: 10/861,696

(22) Filed: Jun. 4, 2004

(65) Prior Publication Data

US 2005/0271030 A1    Dec. 8, 2005

(51) Int. Cl.
H04B 7/00    (2006.01)

(52) U.S. Cl. .................................. 455/509; 455/11.1

(58) Field of Classification Search ................ 455/509, 455/41.2, 7, 11.1, 13.1, 16, 450, 561; 370/414, 370/416, 346, 349, 315, 492, 501
See application file for complete search history.

(56) References Cited

U.S. PATENT DOCUMENTS

2002/0075940 A1*  6/2002  Haartsen .................... 375/132
2002/0093953 A1   7/2002  Naim et al.
2002/0107039 A1*  8/2002  Hong ......................... 455/509
2002/0107047 A1*  8/2002  Sydon et al. ................ 455/561
2003/0174764 A1   9/2003  Mahany
2004/0047324 A1   3/2004  Diener

* cited by examiner

Primary Examiner—Tu X Nguyen
(74) Attorney, Agent, or Firm—Garlick Harrison & Markison; Timothy W. Markison; Holly L. Rudnick (57) ABSTRACT

A method for adaptive piconet protocol begins by determining, by a master device, a number of slave devices that are currently affiliated with the master device in a piconet. The method continues by determining, by the master device, data requirements and voice requirements of each of the slave devices currently affiliated with the master device in the piconet. The method continues by establishing, by the master device, an information exchange format based on the number of slave devices, the data requirements of each of the slave devices, and the voice requirements of each of the slave devices. The information exchange format includes at least one multiple frequency locked partial packets for slave data responses to a single master data request packet, multiple frequency locked packets for slave voice responses to a single master voice request packet, and non-restrictive slot positioning of the single master data request and of the signal master voice request.

28 Claims, 5 Drawing Sheets

FIG. 1
prior art

FIG. 2
piconet 10

FIG. 3
piconet 10

FIG. 4
piconet 10

FIG. 5
game system 70

ADAPTIVE PICONET PROTOCOL

BACKGROUND OF THE INVENTION

1. Technical Field of the Invention

This invention relates generally to wireless communication systems and more particularly to an adaptive piconet wireless communication system.

2. Description of Related Art

Figure 1:
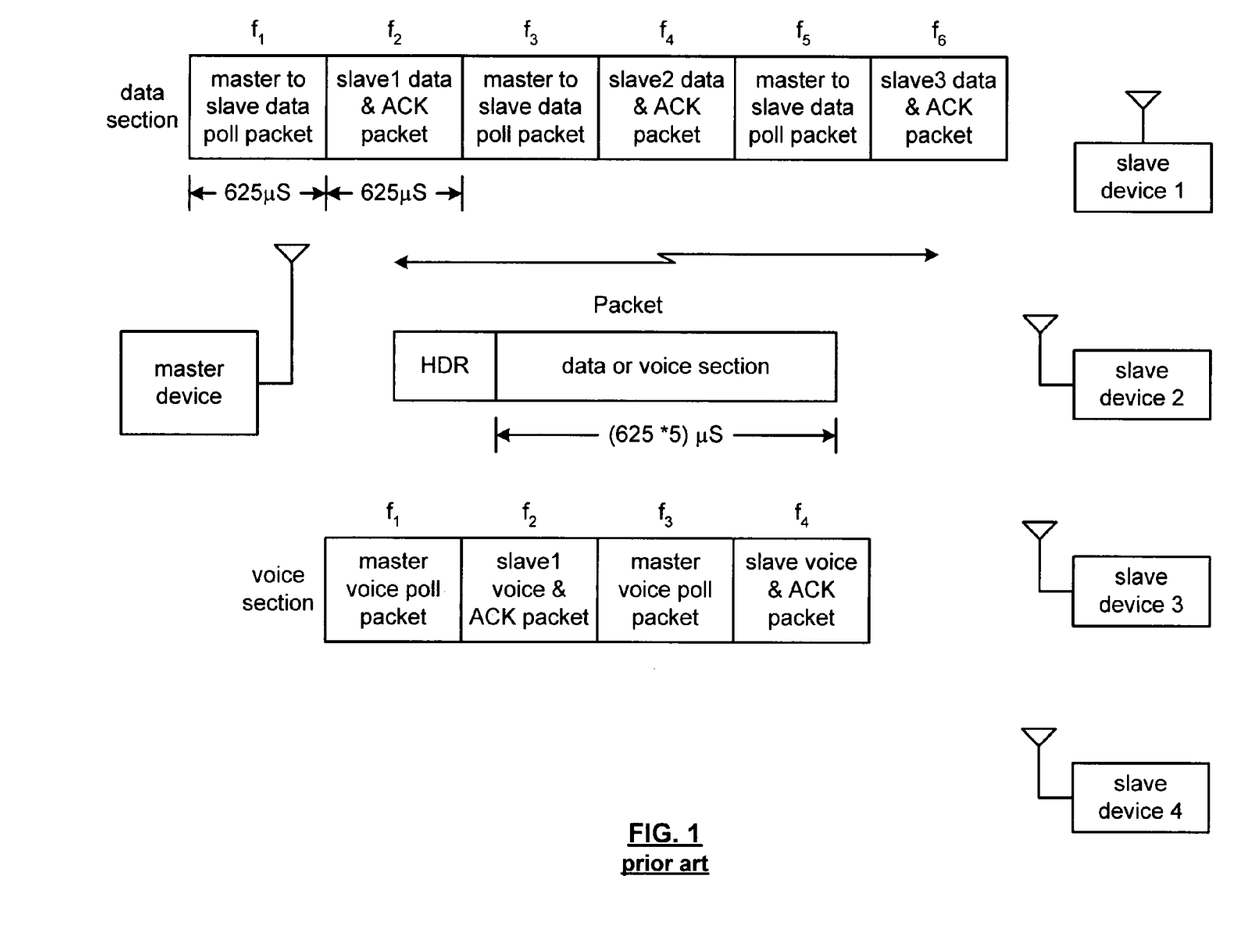
FIG. 1 is a schematic block diagram of a prior art piconet.

FIG. 1 is a schematic block diagram of a Bluetooth compliant piconet that includes a master device and a plurality of slave devices. In accordance with the Bluetooth specification, the master device and each the slave devices includes a radio frequency transceiver that functions in accordance with one or more versions of the Bluetooth standard to support the conveyance of packets via a wireless communication channel. In this illustration, a data or voice packet is transmitted via the wireless communication channel between the master device and plurality of slave devices.

As shown, the Bluetooth packet includes a header section, which may include an access code and a packet header, and a payload section. The payload section may include a data section or a voice section and may be up to 3.125 milliseconds (e.g., 625 µSec*5) in duration.

The data section is divided into a plurality of slots, each 625 microseconds in duration. As is further shown, the $1^{st}$ slot is allocated to the master and may be used for polling the slaves with respect to whether the slaves have data to transmit to the master. The next four slots may be allocated to each of the slaves for transmitting their respective data as well as providing a packet acknowledgment. In accordance with the Bluetooth standard, frequency hopping is used on a slot-by-slot basis such that for the $1^{st}$ slot, which is allocated to the master, a $1^{st}$ frequency ($f_1$) is used. For the $2^{nd}$ slot, a $2^{nd}$ frequency ($f_2$) is used and so on. As is known, the frequency hopping sequence is unique for each piconet and is determined by the master device. The master device establishes the frequency hopping scheme and provides it to the slave devices. While the frequency hopping enables communications to avoid frequencies that may have high levels of noise or other problems, it does so at the cost of processing time to change the transceivers frequency response from one frequency to the next in the frequency hopping sequence.

The data section of the payload has a further restriction with respect to slot positioning for the master. In particular, the restrictive slot positioning follows a pattern of master-slave-master-slave, master-slave-slave-master-slave-slave, master-slave-slave-slave-master-slave-slave-slave, et cetera. As such, once the pattern is established for the particular packet, it must be adhered to even if no data is available for transmission during an allocated slot.

The voice section of the payload includes a slot allocation of master-slave-master-slave. Each allocated master slot includes a master voice poll packet to a particular slave. The next slot is allocated for the particular slave to respond with its voice data and a packet acknowledgment. As shown, from slot-to-slot, the frequency changes in accordance with the frequency hopping sequence established by the master device. While the current structure of the data voice packet enables a multitude of devices to communicate in a piconet fashion, it has the frequency hopping on a per-slot-basis requirement and also has the restrictive slot positioning of the master-to-slave. As such, for certain applications where the slaves' data and voice payload requirements vary, such a rigid structure limits the overall efficiency of the piconet. In particular, a gaming system where the master device is a game console and the slave devices are game controllers, the amount of data between the slave devices and master device will vary significantly over time. Thus, efficiency of a gaming system that follows the rigid structure of a Bluetooth packet is limited.

Therefore, a need exists for a method of providing an adaptive piconet protocol to overcome the above mentioned efficient limitations of a piconet.

BRIEF SUMMARY OF THE INVENTION

The adaptive piconet protocol of the present invention substantially meets these needs and others. In one embodiment, a method for adaptive piconet protocol begins by determining, by a master device, a number of slave devices that are currently affiliated with the master device in a piconet. The method continues by determining, by the master device, data requirements and voice requirements of each of the slave devices currently affiliated with the master device in the piconet. The method continues by establishing, by the master device, an information exchange format based on the number of slave devices, the data requirements of each of the slave devices, and the voice requirements of each of the slave devices. The information exchange format includes at least one multiple frequency locked partial packets for slave data responses to a single master data request packet, multiple frequency locked packets for slave voice responses to a single master voice request packet, and non-restrictive slot positioning of the single master data request and of the signal master voice request.

In another embodiment, a master device for use in a piconet having an adaptive piconet protocol includes a processing module and memory. The memory is operably coupled to the processing module, wherein the memory stores operational instructions that cause the processing module to determine a number of slave devices that are currently affiliated with the master device in the piconet. The memory also stores operational instructions that cause the processing module to determine data requirements and voice requirements of each of the slave devices currently affiliated with the master device in the piconet. The memory also stores operational instructions that cause the processing module to establish an information exchange format based on the number of slave devices, the data requirements of each of the slave devices, and the voice requirements of each of the slave devices. The information exchange format includes at least one multiple frequency locked partial packets for slave data responses to a single master data request packet, multiple frequency locked packets for slave voice responses to a single master voice request packet, and non-restrictive slot positioning of the single master data request and of the signal master voice request.

In yet another embodiment, a slave device for use in a piconet having an adaptive piconet protocol includes a processing module and memory. The memory is operably coupled to the processing module, wherein the memory stores operational instructions that cause the processing module to provide data requirements and voice requirements to a master device in the piconet. The memory also stores operational instructions that cause the processing module to transceive voice and data in accordance with an information exchange format. The information exchange format includes at least one multiple frequency locked partial packets for slave data responses to a single master data request packet, multiple frequency locked packets for slave voice responses to a single master voice request packet, and non-restrictive slot positioning of the single master data request and of the signal master voice request.

DETAILED DESCRIPTION OF THE INVENTION

Figure 2:
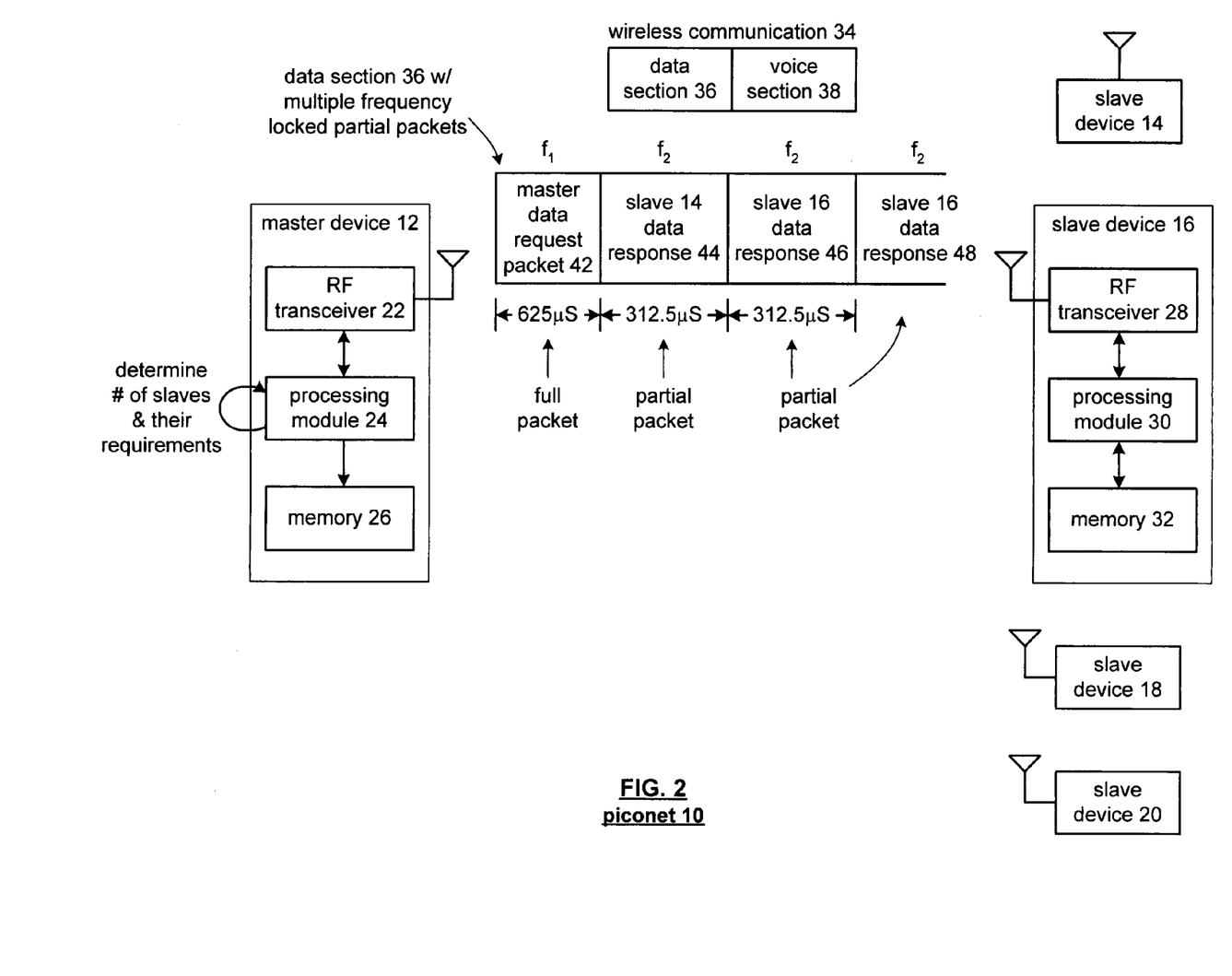
FIG. 2 is a schematic block diagram of a piconet in accordance with the present invention.

FIG. 2 is a schematic block diagram of a piconet 10 that includes a master device 12 and a plurality of slave devices 14-20. The piconet 10 may be established in accordance with conventional Bluetooth bonding of the devices 12-20 to form a piconet. The master device 12 includes a radio frequency (RF) transceiver 22, processing module 24 and memory 26. The processing module 24 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 26 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 24 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory 26 stores, and the processing module 24 executes, operational instructions corresponding to at least some of the steps and/or functions illustrated in FIGS. 2-5.

Each of the slave devices 14-20, as represented by slave device 16, includes an RF transceiver 28, processing module 30 and memory 32. The processing module 30 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 32 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 30 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory 32 stores, and the processing module 30 executes, operational instructions corresponding to at least some of the steps and/or functions illustrated in FIGS. 2-5.

In such a piconet 10, wireless communications 34 may include packets that include a data section 36 and a voice section 38. To facilitate the construct of the data section 36 and voice section 38, processing module 24 performs an algorithm to determine the number of slaves and their data and voice requirements. Once the master device has obtained the number of slaves and their corresponding data and voice requirements, the master device establishes an information exchange format for the packets of the wireless communication 34 based on the number of slave devices, the data requirements of each of the slaves devices and the voice requirements of each of the slave devices. The information exchange format includes at least one of multiple frequency locked partial packets for slave data responses to a single master data request packet, multiple frequency locked packets for slave voice responses to a single master voice request packet, and non-restrictive slot positioning of the single master data request and of the single master voice request.

FIG. 2 further illustrates the data section 36 to include multiple frequency locked partial packets. In this illustration, a packet corresponds to a 625 microsecond slot within then payload of a data voice packet. As shown, the $1^{st}$ slot is allocated to the master for a single master data request packet 42. The request packet may be for one or more of the slaves and in accordance with Bluetooth. In this illustration, the master data request packet 42 is for all of the slaves. The next slot, (i.e., the next 625 microseconds) is divided into two partial packets each 312.5 microseconds in duration. The $1^{st}$ partial packet is allocated to slave device 14 for its data response 44 and corresponding packet acknowledgment. The next partial packet is allocated to slave 16 for its data response 46 and corresponding packet acknowledgment. The next partial packet may again be allocated to slave 16 for another data response 48 and its corresponding packet acknowledgment. As such, the master may allocate the partial packets to the slaves based on their corresponding data requirements. In this illustration, slave 16 had approximately twice the data requirement of slave 14.

The data section 36 illustrates that the frequency hopping sequence includes only two frequencies $f_1$ and $f_2$ for this portion of the data section 36. As shown, the master data request packet 42 may use a frequency $f_1$ of the frequency hopping sequence while each of the slave responses uses the same frequency for example $f_2$ of the frequency hopping sequence. By locking the frequency hopping sequence to a particular frequency for the slave responses, the time to readjust the RF transceivers 22 and 28 to accommodate the frequency hopping sequence from slot-to-slot is eliminated thus eliminating the time required for the frequency hopping conversions. As such, the overall efficiency of data transmissions within piconet 10 is improved.

As one of average skill in the art will appreciate, the frequency hopping sequence as illustrated in FIG. 2 may be carried out for the entire data section 36 where the master utilizes the same $f_1$ frequency and the slaves use the same $f_2$ frequency throughout the data section. Alternatively, the frequency locking of $f_1$ and $f_2$ may be limited to each master data request packet and the corresponding slave responses such that, for the next master data request packet, the master would use another frequency (e.g., $f_3$) in the frequency hopping sequence and the slaves would use yet another frequency (e.g., $f_4$) in the frequency hopping sequence.

As one of average skill in the art will further appreciate, each slot for a slave response may be divided into more than two partial packets and may, from slot-to-slot, vary in the subdivision of the slot into partial packets. The master determines the subdividing of a slot into partial packets and the allocation of the partial packets to the slaves as well as the frequency for the slaves to transmit their respective data responses. Note that the master device 12 may periodically, or randomly, update the information exchange format of the data section 36 and/or voice section 38 as slave devices enter or leave the piconet and/or as the data and/or voice requirements of the slave devices change thus improving the efficiency of the piconet.

Figure 3:
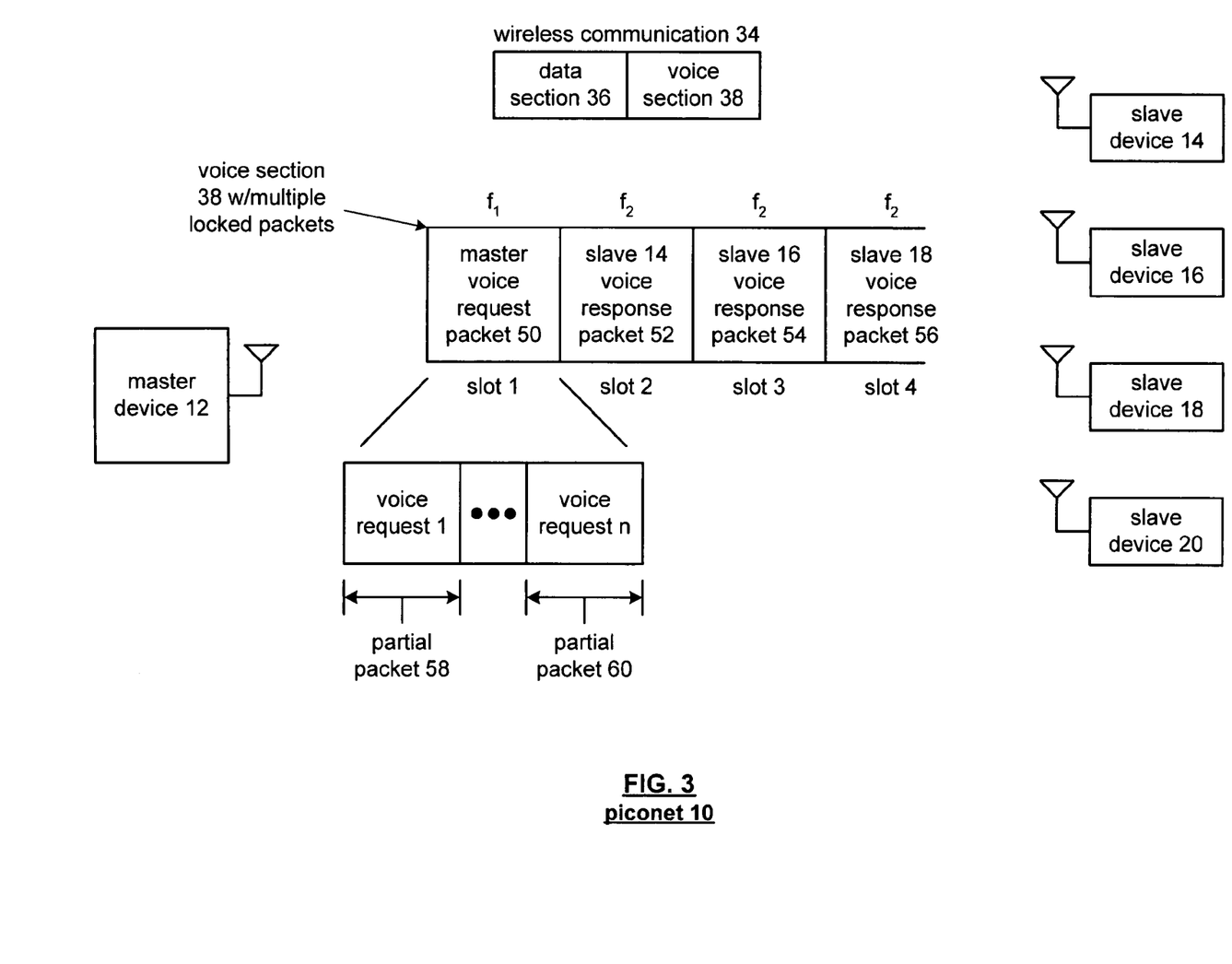
FIG. 3 is a schematic block diagram of another piconet in accordance with the present invention.

FIG. 3 is a schematic block diagram of the piconet 10 as shown in FIG. 2 but further illustrates the voice section 38 with multiple locked frequency packets. In this illustration, the voice section 38 includes a plurality of slots where the $1^{st}$ slot is allocated to the master for a master voice request packet 50. The next three slots are allocated to slaves 14, 16 and 18 for their respective voice response packets 52-56. Note that the master voice request packet 50 may be divided into a plurality of partial packets 58-60. Each partial packet of the master voice request packet 50 polls a corresponding slave of piconet 10. In this illustration, the master voice request packet 50 includes three requests for slaves 14, 16 and 20.

Note that the master voice request packet 50 utilizes a $1^{st}$ frequency $f_1$ of a frequency hopping sequence and each of the slaves use another, but the same, frequency $f_2$ of the frequency hopping sequence. The master device 12 determines the particular frequencies of the frequency hopping sequence.

As one of average skill in the art will appreciate, the frequency used by the frequency hopping sequence may utilize only $f_1$ and $f_2$ throughout the voice section 38 or, for each pairing of a master voice request packet and corresponding slave voice response packets, may use two frequencies of the frequency hopping sequence and vary from grouping-to-grouping. As one of average skill in the art will further appreciate, the master device 12 may update periodically, or randomly, the slot allocations of the voice section 38 as slave devices enter or leave the piconet 10 and/or as their voice requirements change. Further note that the master device may allocate one or more slots per master voice request packet 50 to one or more slaves.

Figure 4:
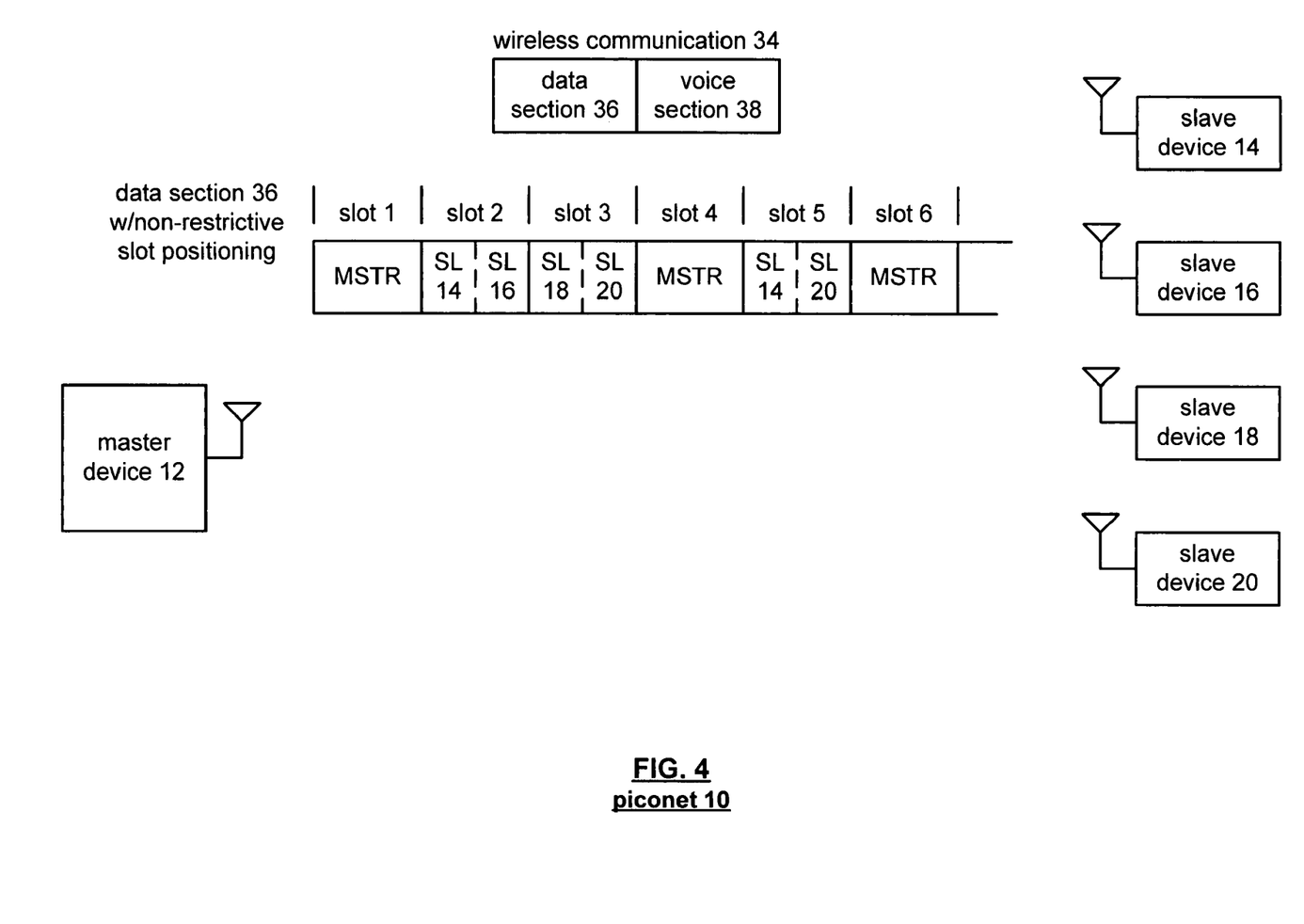
FIG. 4 is a schematic block diagram of yet another piconet in accordance with the present invention.

FIG. 4 is a schematic block diagram of piconet 10 and further illustrates the non-restrictive slot positioning within the data section 36, which also represents the non-restrictive slot positioning within the voice section 38. In this illustration, the $1^{st}$ slot of the data section 36 is allocated to the master for a request. The next two slots, slots 2 and 3 are partial slots and allocated to slaves 14-20 as illustrated. The $4^{th}$ slot is again allocated to the master for a data request. The next slot, slot 5 includes two partial packets for slaves 14 and 20. The next slot, slot 6 is again allocated to the master for a data request packet. As such, as the master device 12 deems appropriate, any slot may be allocated to the master for a data request and other slots may be allocated and divided into partial packets for slave responses, thus eliminating the restrictive master-slave slot positioning of existing Bluetooth standards.

For the voice section 38, the master may allocate any slot ordering for the master device and corresponding slave devices, thus eliminating the restrictive master-slave slot positioning of existing Bluetooth standards. Recall that, for the voice section, the master may divide the voice request packet into two or more partial packets for multiple slave requests.

Figure 5:
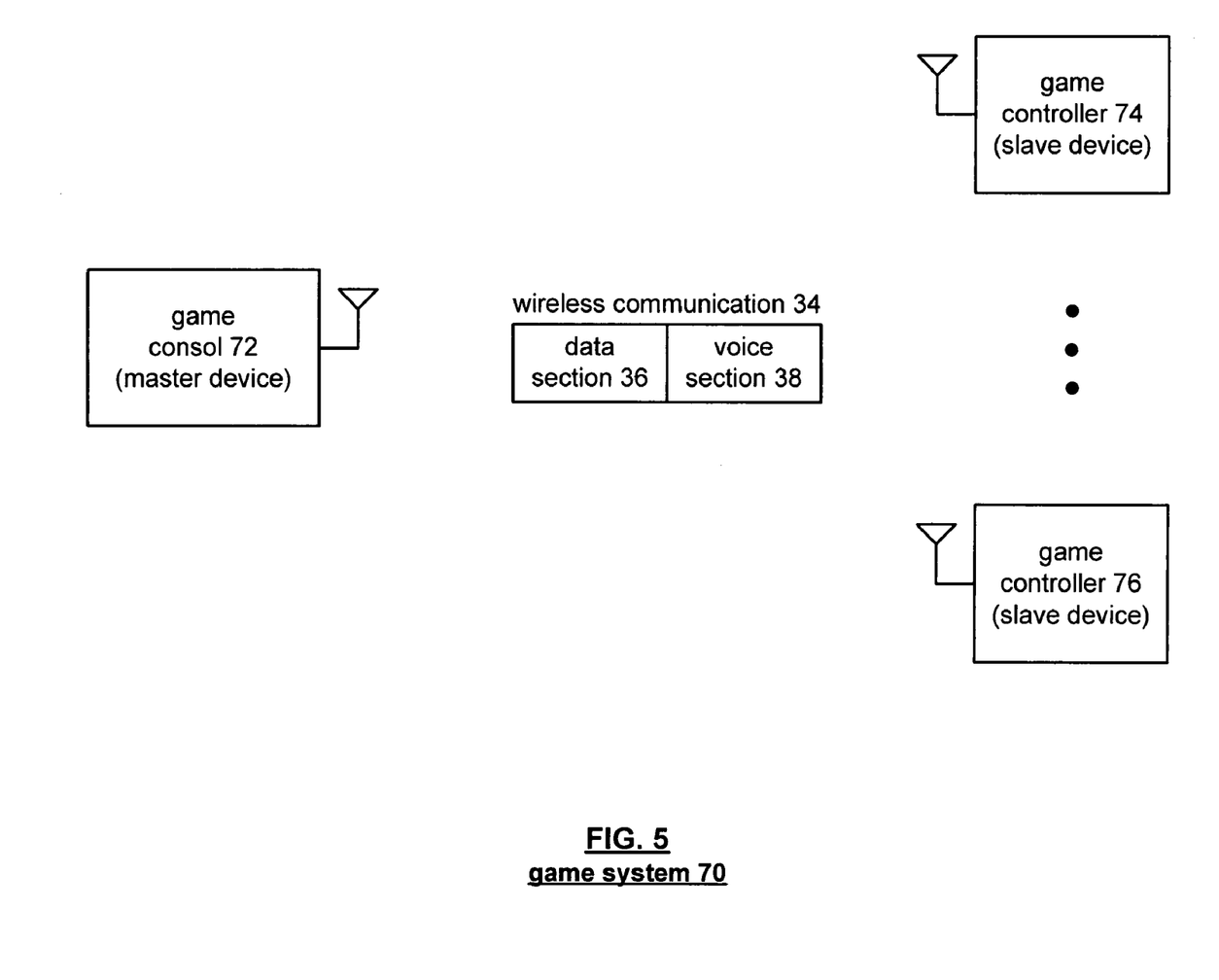
FIG. 5 is a schematic block diagram of a game system in accordance with the present invention.

FIG. 5 is a schematic block diagram of a game system 70 that includes a game console 72 and a plurality of game controllers 74-76. In this illustration, the game console 72 may be a master device while the game controllers 74 and 76 are slave devices. Wireless communications 34 between the game console 72 and game controller 74 and 76 may include a data section 36 and voice section 38. As the master device, the game console 72 may allocate slot positioning or partial slot positioning (e.g., partial packets) to one or more slots as previously described with reference to FIGS. 2-4.

As one of average skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for establishing a piconet that includes an adaptive piconet protocol. By providing an adaptive piconet protocol, data and or voice may be communicated more efficiently between the master devices and slave devices and may be readily adjusted as the requirements of the devices change. As one of average skill in the art will appreciate, other embodiments may be derived from the teaching of the present invention without deviating from the scope of the claims.

What is claimed is:

1. A method for adaptive piconet protocol, the method comprises:

determining, by a master device, a number of slave devices that are currently affiliated with the master device in a piconet;

determining, by the master device, data requirements and voice requirements of each of the slave devices currently affiliated with the master device in the piconet;

establishing, by the master device, an information exchange format based on the number of slave devices, the data requirements of each of the slave devices, and the voice requirements of each of the slave devices, wherein the information exchange format includes:

multiple frequency locked partial packets for slave data responses to a single master data request packet, each of the frequency locked partial packets corresponding to a portion of a time slot allocated to one of the slave data responses and each of the frequency locked partial packets having the same frequency;

multiple frequency locked packets for slave voice responses to a single master voice request packet, each of the frequency locked packets corresponding to a particular time slot allocated to one of the slave voice responses and each of the frequency locked packets having the same frequency; and non-restrictive slot positioning of the single master data request and of the single master voice request.

2. The method of claim 1 farther comprises:

transmitting, by the master device, the single master data request packet using a first frequency of a frequency hopping sequence; and transmitting, by each of the slave devices in accordance with the multiple frequency locked partial packets, the slave data responses using a second frequency of the frequency hopping sequence.

3. The method of claim 1, wherein the multiple frequency locked partial packets comprises two or more partial slots.

4. The method of claim 3 comprises:

assigning, by the master device, the slave devices to the multiple frequency locked partial packets in an equal manner or an unequal manner based on the data requirements of each of the slave devices.

5. The method of claim 1, wherein the information exchange format comprises:

a non-restrictive master-slave slot relationship.

6. The method of claim 1, wherein the information exchange format comprises:

a non-restrictive master device slot positioning.

7. The method of claim 1 further comprises:

transmitting, by the master device, the single master voice request packet using a first frequency of a frequency hopping sequence; and transmitting, by each of the slave devices in accordance with the multiple frequency locked packets, the slave voice responses using a second frequency of the frequency hopping sequence.

8. The method of claim 1 comprises:

the master device including a gaming control consol; and the slave devices including gaming input devices.

9. The method of claim 1 further comprises:

updating, by the master device, the information exchange format based on slave devices entering the piconet and based on slave devices leaving the piconet.

10. The method of claim 1, wherein the single master voice request packet includes at least a first partial voice packet request for a first slave device of the slaves devices and a second partial voice packet request for a second slave device of the slave devices.

11. A master device for use in a piconet having an adaptive piconet protocol, the master device comprises:

a processing module; and memory operably coupled to the processing module, wherein the memory stores operational instructions that cause the processing module to:

determine a number of slave devices that are currently affiliated with the master device in the piconet;

determine data requirements and voice requirements of each of the slave devices currently affiliated with the master device in the piconet;

establish an information exchange format based on the number of slave devices, the data requirements of each of the slave devices, and the voice requirements of each of the slave devices, wherein the information exchange format includes:

multiple frequency locked partial packets for slave data responses to a single master data request packet, each of the frequency locked partial packets corresponding to a portion of a time slot allocated to one of the slave data responses and each of the frequency locked partial packets having the same frequency;

multiple frequency locked packets for slave voice responses to a single master voice request packet, each of the frequency locked packets corresponding to a particular time slot allocated to one of the slave voice responses and each of the frequency locked packets having the same frequency; and non-restrictive slot positioning of the single master data request and of the single master voice request.

12. The master device of claim 11, wherein the single master voice request packet includes at least a first partial voice packet request for a first slave device of the slaves devices and a second partial voice packet request for a second slave device of the slave devices.

13. The master device of claim 11, wherein the memory further comprises operational instructions that cause the processing module to:

transmit the single master data request packet using a first frequency of a frequency hopping sequence; and receive, from each of the slave devices in accordance with the multiple frequency locked partial packets, the slave data responses using a second frequency of the frequency hopping sequence.

14. The master device of claim 11, wherein the multiple frequency locked partial packets comprises two or more partial slots.

15. The master device of claim 14, wherein the memory further comprises operational instructions that cause the processing module to:

assign the slave devices to the multiple frequency locked partial packets in an equal manner or an unequal manner based on the data requirements of each of the slave devices.

16. The master device of claim 11, wherein the information exchange format comprises:

a non-restrictive master-slave slot relationship.

17. The master device of claim 12, wherein the information exchange format comprises:

a non-restrictive master device slot positioning.

18. The master device of claim 11, wherein the memory further comprises operational instructions that cause the processing module to:

transmit the single master voice request packet using a first frequency of a frequency hopping sequence; and receive, from each of the slave devices in accordance with the multiple frequency locked packets, the slave voice responses using a second frequency of the frequency hopping sequence.

19. The master device of claim 11 comprises:

a gaming control consol, wherein the slave devices include gaming input devices.

20. The master device of claim 11, wherein the memory further comprises operational instructions that cause the processing module to:

update the information exchange format based on slave devices entering the piconet and based on slave devices leaving the piconet.

21. A slave device for use in a piconet having an adaptive piconet protocol, the slave device comprises:

a processing module; and memory operably coupled to the processing module, wherein the memory stores operational instructions that cause the processing module to:

provide data requirements and voice requirements to a master device in the piconet;

transceive voice and data in accordance with an information exchange format, wherein the information exchange format includes:

multiple frequency locked partial packets for slave data responses to a single master data request packet, each of the frequency locked partial packets corresponding to a portion of a time slot allocated to one of the slave data responses and each of the frequency locked partial packets having the same frequency;

multiple frequency locked packets for slave voice responses to a single master voice request packet, each of the frequency locked packets corresponding to a particular time slot allocated to one of the slave voice responses and each of the frequency locked packets having the same frequency; and non-restrictive slot positioning of the single master data request and of the single master voice request.

22. The slave device of claim 21, wherein the memory further comprises operational instructions that cause the processing module to:

respond to a first partial voice packet request of the single master voice request packet.

23. The slave device of claim 21, wherein the memory further comprises operational instructions that cause the processing module to:

receive the single master data request packet at a first frequency of a frequency hopping sequence; and transmit, in accordance with the multiple frequency locked partial packets, the slave data response using a second frequency of the frequency hopping sequence.

24. The slave device of claim 21, wherein the multiple frequency locked partial packets comprises two or more partial slots.

25. The slave device of claim 21, wherein the information exchange format comprises:

a non-restrictive master-slave slot relationship.

26. The slave device of claim 21, wherein the information exchange format comprises:

a non-restrictive master device slot positioning.

27. The slave device of claim 21, wherein the memory further comprises operational instructions that cause the processing module to:

receive the single master voice request packet using a first frequency of a frequency hopping sequence; and transmit, in accordance with the multiple frequency locked packets, the slave voice response using a second frequency of the frequency hopping sequence.

28. The slave device of claim 21 comprises:

a gaming input device, wherein the master device includes a gaming control consol.

* * * * *

UNITED STATES PATENT AND TRADEMARK OFFICE
CERTIFICATE OF CORRECTION

| | | |
|---|---|---|
| PATENT NO. | : 7,532,904 B2 | Page 1 of 1 |
| APPLICATION NO. | : 10/861696 | |
| DATED | : May 12, 2009 | |
| INVENTOR(S) | : Jason Ming Yu Lin | |

It is certified that error appears in the above-identified patent and that said Letters Patent is hereby corrected as shown below:

Column 7, line 11, in Claim 2: replace "farther" with --further--.

Signed and Sealed this

Thirtieth Day of June, 2009

JOHN DOLL
*Acting Director of the United States Patent and Trademark Office*